(12) United States Patent
Miura et al.

(10) Patent No.: US 7,978,433 B2
(45) Date of Patent: Jul. 12, 2011

(54) RECORDING-MEDIUM DRIVING DEVICE

(75) Inventors: Kazutoshi Miura, Miyagi-ken (JP); Kiyoyuki Ito, Fukushima-ken (JP)

(73) Assignees: Alps Electric Co., Ltd., Tokyo (JP); Imation Corporation, Oakdale, MN (US)

( * ) Notice: Subject to any disclaimer, the term of this patent is extended or adjusted under 35 U.S.C. 154(b) by 492 days.

(21) Appl. No.: 12/240,691

(22) Filed: Sep. 29, 2008

(65) Prior Publication Data
US 2009/0116146 A1  May 7, 2009

(30) Foreign Application Priority Data

Oct. 1, 2007 (JP) ................. 2007-257285

(51) Int. Cl.
*G11B 23/03* (2006.01)
(52) U.S. Cl. ..................................... 360/133
(58) Field of Classification Search .............. 360/133, 360/97.01
See application file for complete search history.

(56) References Cited

U.S. PATENT DOCUMENTS
6,097,567 A * 8/2000 Hanson ............... 360/97.01
6,619,766 B1 * 9/2003 Mansueto .............. 312/223.1

FOREIGN PATENT DOCUMENTS
JP   3924677    3/2007
JP   2007-227215  9/2007

* cited by examiner

*Primary Examiner* — Angel A. Castro
(74) *Attorney, Agent, or Firm* — Beyer Law Group LLP (57) ABSTRACT

When a medium casing is properly inserted, a first pair of projections and a second pair of projections are passed through between a first bottom surface and a second bottom surface of a chassis in the moving direction and are thus prevented from coming into contact with the first and second bottom surfaces, thereby allowing for smooth insertion of the medium casing. In contrast, when the medium casing is inserted improperly from its wrong end, one of the projections on the lower surface of the medium casing comes into abutment with the second bottom surface of the chassis near the opening. Accordingly, an improperly inserted medium casing can be prevented from being inserted any further at an early stage of the insertion process.

3 Claims, 10 Drawing Sheets

RECORDING-MEDIUM DRIVING DEVICE

CLAIM OF PRIORITY

This application claims benefit of the Japanese Patent Application No. 2007-257285 filed on Oct. 1, 2007, which is hereby incorporated by reference.

BACKGROUND OF THE INVENTION

1. Field of the Invention

The present invention relates to recording-medium driving devices that perform recording/reproducing operations on recording media such as hard disks, and particularly, to a recording-medium driving device of an auto-loading type.

2. Description of the Related Art

Examples of portable recording media capable of magnetically or optically storing a large volume of data include a card memory type recording medium that employs flash memory and a box type recording medium (hard disk) containing a stack of magnetic disks.

Portable recording media of these examples are loadable and unloadable with respect to a dedicated recording-medium driving device. Specifically, a portable recording medium can be loaded into a recording-medium driving device when a recording or reproducing operation is to be performed, or can be unloaded from the recording-medium driving device for portable purposes. The connection between the recording medium and the recording-medium driving device generally involves the use of connectors.

With regard to a recording medium of this type, if the recording medium is inserted improperly from its wrong end or in an upside-down position into the recording-medium driving device, such improper insertion can result in damage or breakage of the connectors. Japanese Unexamined Patent Application Publication No. 2007-227215 and Japanese Patent No. 3924677 disclose inventions related to the prevention of such improper insertion of a recording medium.

Japanese Unexamined Patent Application Publication No. 2007-227215 relates to the prevention of improper insertion of a card inserted upside down into a housing. Specifically, the improper insertion is prevented by allowing the leading end of the inserted card in the upside-down position to come into abutment with a member such as a lock spring provided inside the housing.

On the other hand, in Japanese Patent No. 3924677, an improper-insertion-prevention protrusion is provided in an inward section of a housing. In this case, when a card is inserted improperly from its wrong end, the leading end of the inserted card abuts onto the improper-insertion-prevention protrusion, whereby the improper insertion of the card can be prevented.

With Japanese Unexamined Patent Application Publication No. 2007-227215 and Japanese Patent No. 3924677, however, it is necessary to insert the recording medium (card) by a certain amount or more into the housing until the leading end of the recording medium comes into abutment with an obstacle provided in an inward section of the housing. This is problematic in that the user cannot be immediately informed of the improper insertion.

In addition, Japanese Unexamined Patent Application Publication No. 2007-227215 and Japanese Patent No. 3924677 each relate to an improper-insertion-prevention mechanism that corresponds either to the case where a card is inserted improperly from its wrong end or to the case where a card is inserted improperly in an upside-down position, but unfortunately cannot correspond to both cases.

SUMMARY OF THE INVENTION

The present invention provides a recording-medium driving device that can prevent an improperly inserted recording medium from being inserted any further by stopping the improperly inserted recording medium, regardless of the orientation thereof, at an early stage of the insertion process.

The present invention provides a recording-medium driving device that includes an opening through which a casing containing at least a recording medium is insertable and ejectable; a chassis that supports the casing inserted into the opening and that has a connector portion electrically connectable to the recording medium; and a conveying mechanism that conveys the casing in a moving direction between the opening and an inward section of the device. One of surfaces of the casing has four corners provided with left and right projections, the left and right projections being positioned bilaterally asymmetrical with respect to a center line passing through a center of the recording medium and extending parallel to the moving direction. The chassis has a top surface facing an upper surface of the casing and a pair of left and right bottom surfaces extending in the moving direction and respectively supporting opposite edges of a lower surface of the casing, one of the bottom surfaces having a width smaller than that of the other bottom surface.

In the present invention, a properly inserted casing is allowed to be inserted continuously into the device, whereas an improperly inserted casing is prevented from being inserted any further at the point when the medium casing is inserted into the opening. Accordingly, the user can be immediately informed of the improper insertion.

For example, a distance between the one of the bottom surfaces and the other bottom surface of the chassis is preferably greater than a distance between the left and right projections of the casing. In this case, when the casing inserted into the opening is properly oriented, the left and right projections are located between the one of the bottom surfaces and the other bottom surface disposed opposite to each other in a width direction of the chassis. On the other hand, when the casing inserted into the opening is oriented improperly in a front-rear direction thereof, at least one of the projections is located on the other bottom surface having the greater width.

Furthermore, the following condition is preferably satisfied: $h \leq H < h + \Delta h$, where H denotes a height between the top surface and the bottom surfaces of the chassis, h denotes a thickness of the casing, and $\Delta h$ denotes a height of each of the projections.

DESCRIPTION OF THE PREFERRED EMBODIMENTS

First, a recording medium used in a recording-medium driving device according to the present invention will be described.

Figure 1:
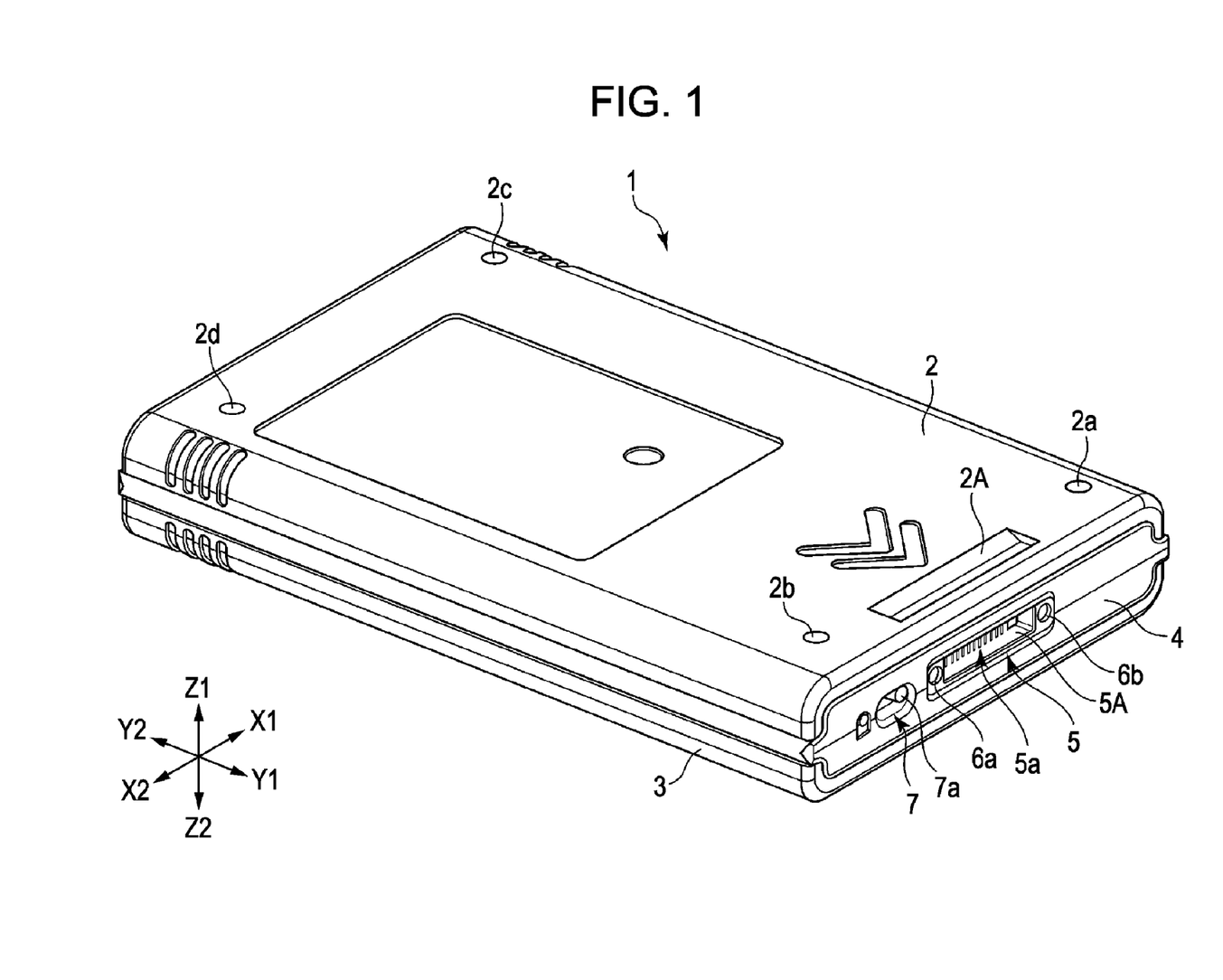
FIG. 1 is an external perspective view of a medium casing containing a recording medium.
Figure 2:
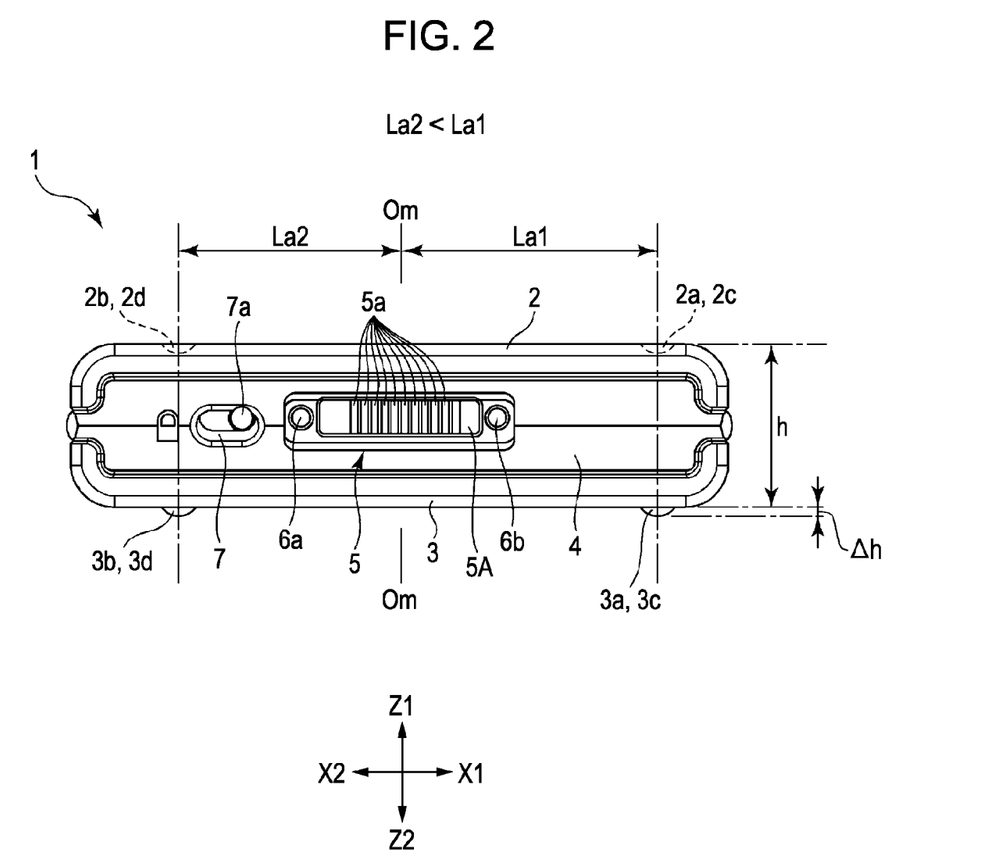
FIG. 2 is a front view of the medium casing shown in FIG. 1.

FIG. 1 is an external perspective view of a medium casing 1 containing a recording medium. FIG. 2 is a front view of the medium casing 1.

As shown in FIGS. 1 and 2, the medium casing 1 is substantially box shaped, and includes an upper casing component 2 serving as an upper cover at the upper side (Z1 side) of the medium casing 1 and a lower casing component 3 serving as a lower cover at the lower side (Z2 side) of the medium casing 1.

The upper casing component 2 and the lower casing component 3 have sandwiched therebetween a recording medium (not shown), such as a hard disk. The thickness of the medium casing 1 itself containing the recording medium (i.e. the thickness between the outer surface of the upper casing component 2 and the outer surface of the lower casing component 3) is represented as h. The recording medium contained in the medium casing 1 is not limited to a hard disk and may alternatively be, for example, a recording medium made of a semiconductor device, such as flash memory, or a hologram recording medium.

The upper casing component 2 has an engagement recess 2A at a forward position thereof as viewed in the Y1 direction. The engagement recess 2A is provided for conveyance purposes and has a fixed width and fixed depth. As will be described later, the medium casing 1 is conveyed by having the engagement recess 2A engaged with an engagement projection provided on a conveying member.

The upper casing component 2 has four corners respectively provided with recesses 2a, 2b, 2c, and 2d that are recessed from the outer surface of the upper casing component 2. The recesses 2a and 2b are located at forward positions of the upper casing component 2, whereas the recesses 2c and 2d are located at rearward positions of the upper casing component 2.

On the other hand, the lower casing component 3 has four corners respectively provided with projections 3a, 3b, 3c, and 3d that are projected from the outer surface of the lower casing component 3. The projections 3a and 3b are located at forward positions of the lower casing component 3, whereas the projections 3c and 3d are located at rearward positions of the lower casing component 3.

The projections 3a, 3b, 3c, and 3d each have a height $\Delta h$, and the overall thickness of the medium casing 1 including the projections 3a, 3b, 3c, and 3d is $h+\Delta h$.

As shown in FIG. 2, the recesses 2a and 2c located closer towards the X1 side and the projections 3a and 3c similarly located closer towards the X1 side are separated from a center line Om-Om of the medium casing 1 with respect to the width direction thereof by a predetermined distance La1 in the X1 direction. On the other hand, the recesses 2b and 2d located closer towards the X2 side and the projections 3b and 3d similarly located closer towards the X2 side are separated from the center line Om-Om by a predetermined distance La2 in the X2 direction.

The distance La1 and the distance La2 have the following relationship: La1>La2. In other words, in the upper casing component 2, the pair of recesses 2a and 2c at the X1 side and the pair of recesses 2b and 2d at the X2 side are formed bilaterally asymmetrical with respect to the center line Om-Om. Likewise, in the lower casing component 3, the pair of projections 3a and 3c at the X1 side and the pair of projections 3b and 3d at the X2 side are formed bilaterally asymmetrical with respect to the center line Om-Om.

Regarding the above-described medium casing 1, when two or more medium casings 1 are stacked one on top of the other in an aligned fashion, the four projections 3a, 3b, 3c, and 3d on the lower casing component 3 of the medium casing 1 positioned on top respectively fit into the four recesses 2a, 2b, 2c, and 2d in the upper casing component 2 of the medium casing 1 positioned on bottom. Therefore, the two or more medium casings 1 can be stacked in a neatly aligned fashion in the height direction (Z direction).

The medium casing 1 has a front panel 4 on the Y1 side thereof. The front panel 4 has a central area that is provided with a first connector 5 having a recessed connector portion 5A. The connector portion 5A of the first connector 5 has a plurality of external connection terminals 5a in an exposed state. The external terminals 5a are made of, for example, copper or gold, and are strip electrodes extending longitudinally in the Z direction. These external terminals 5a are arranged at a predetermined interval in the width direction (X direction). By connecting a second connector 30 of a recording-medium driving device to be described below to these external terminals 5a and sending a predetermined signal thereto, certain data can be written into the recording medium contained in the medium casing 1 or recorded data can be read out from the recording medium.

The left and right ends of the connector portion 5A in the width direction are respectively provided with a pair of positioning holes 6a and 6b extending in the Y direction. As will be described later, these positioning holes 6a and 6b are configured to receive guide pins.

A write protector portion 7 is disposed next to the first connector 5 and is configured to permit or to deny writing of data into the recording medium in the medium casing 1. The write protector portion 7 is defined by a slidable switch that is movable in the X direction, and includes a setting protrusion 7a that protrudes from the outer surface of the front panel 4 so as be used for manipulating the switch. For example, by sliding the setting protrusion 7a in the X1 direction, a "permit writing" mode can be set. On the other hand, by sliding the setting protrusion 7a in the X2 direction, a "deny writing" mode can be set.

A recording-medium driving device for driving the above-described medium casing will now be described.

Figure 3:
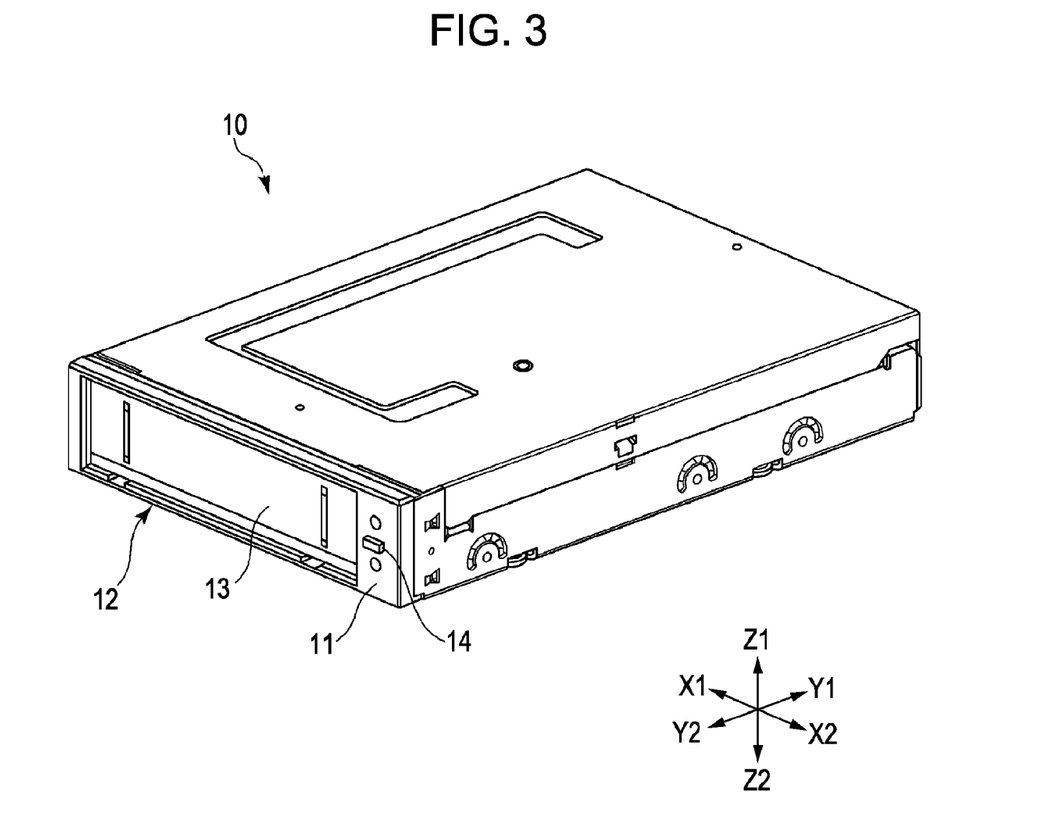
FIG. 3 is a perspective view showing the appearance of a recording-medium driving device according to the present invention.
Figure 4:
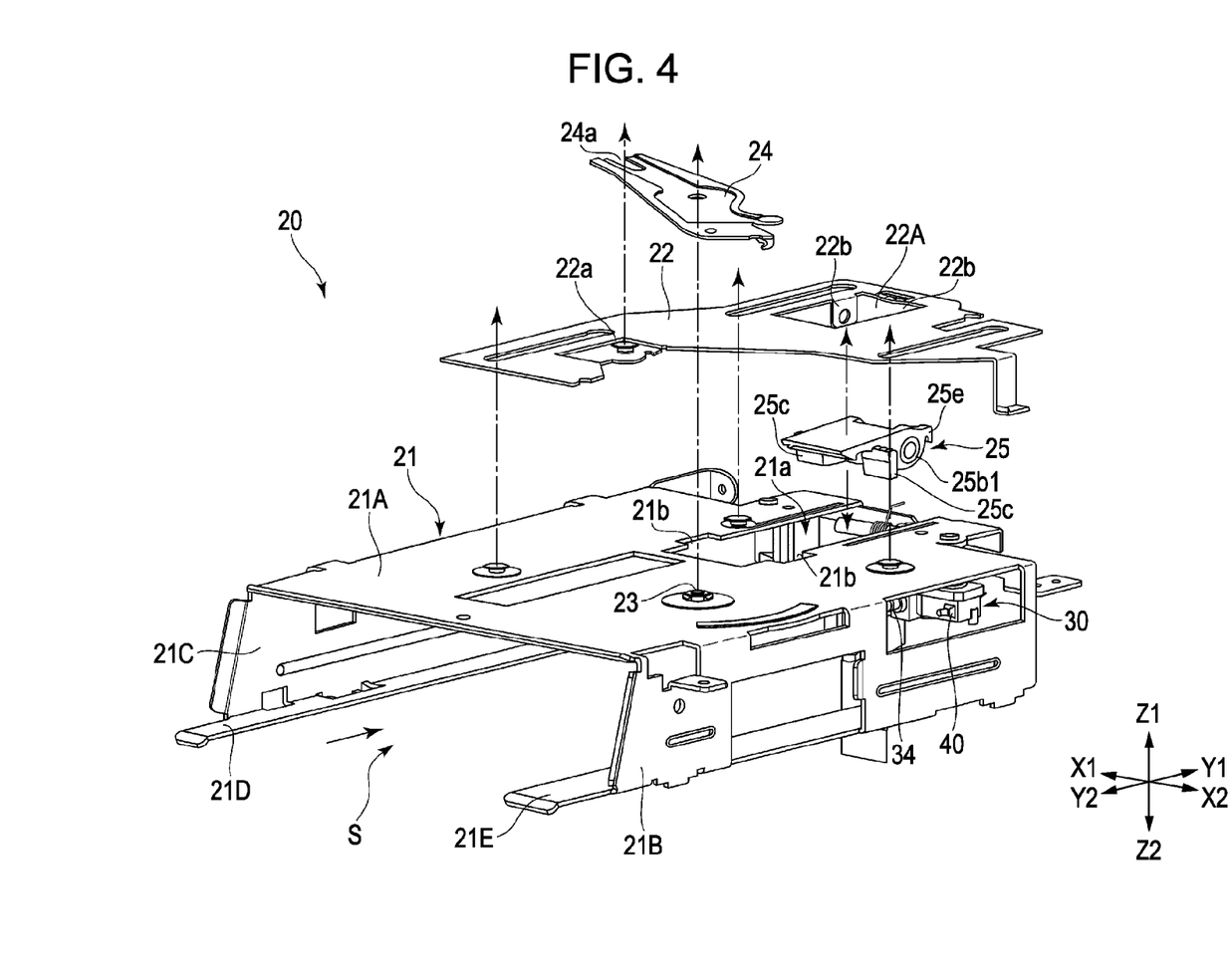
FIG. 4 is an exploded perspective view of a driving-device body contained in the recording-medium driving device.
Figure 5:
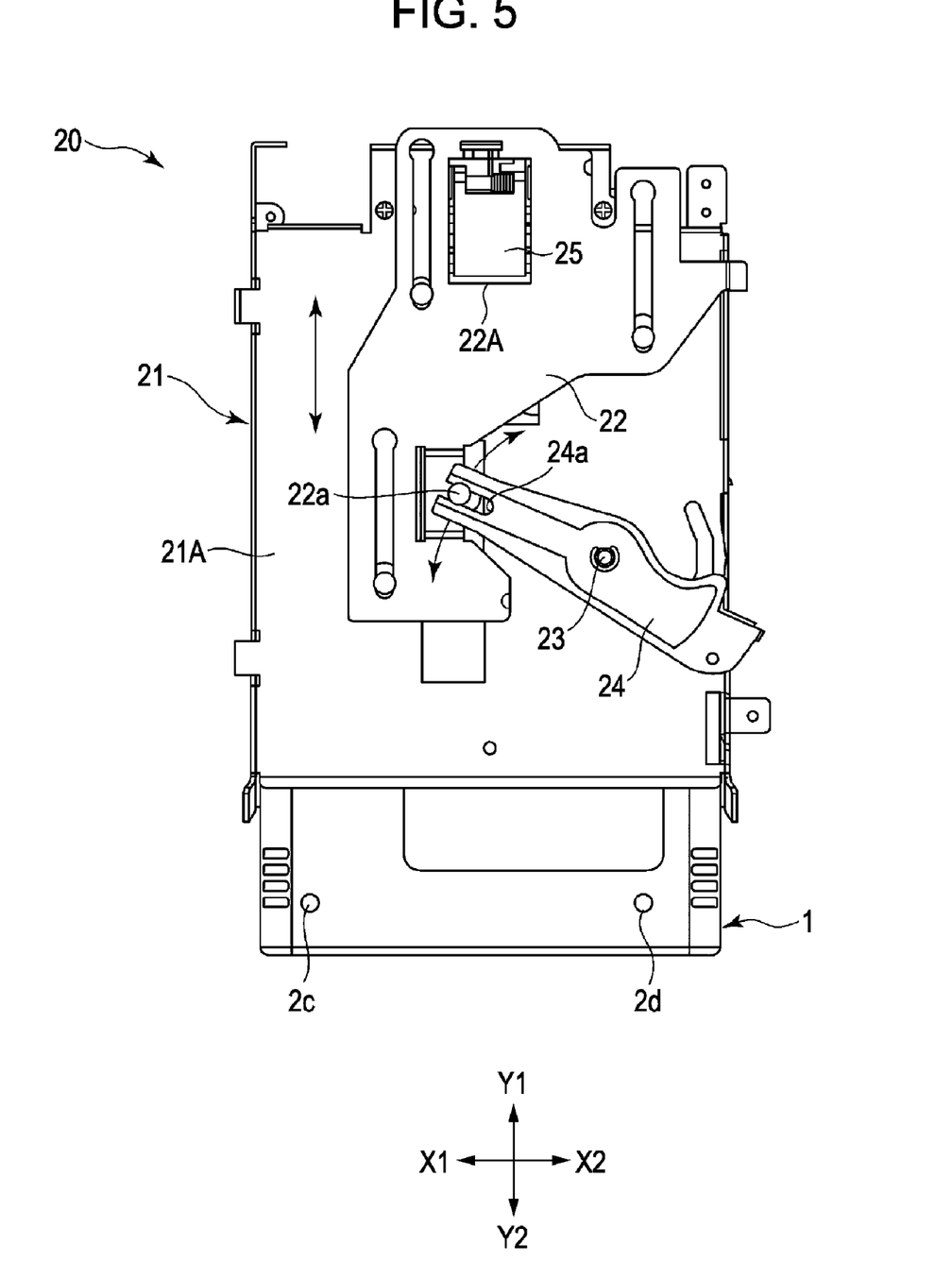
FIG. 5 is a plan view of the driving-device body.
Figure 6:
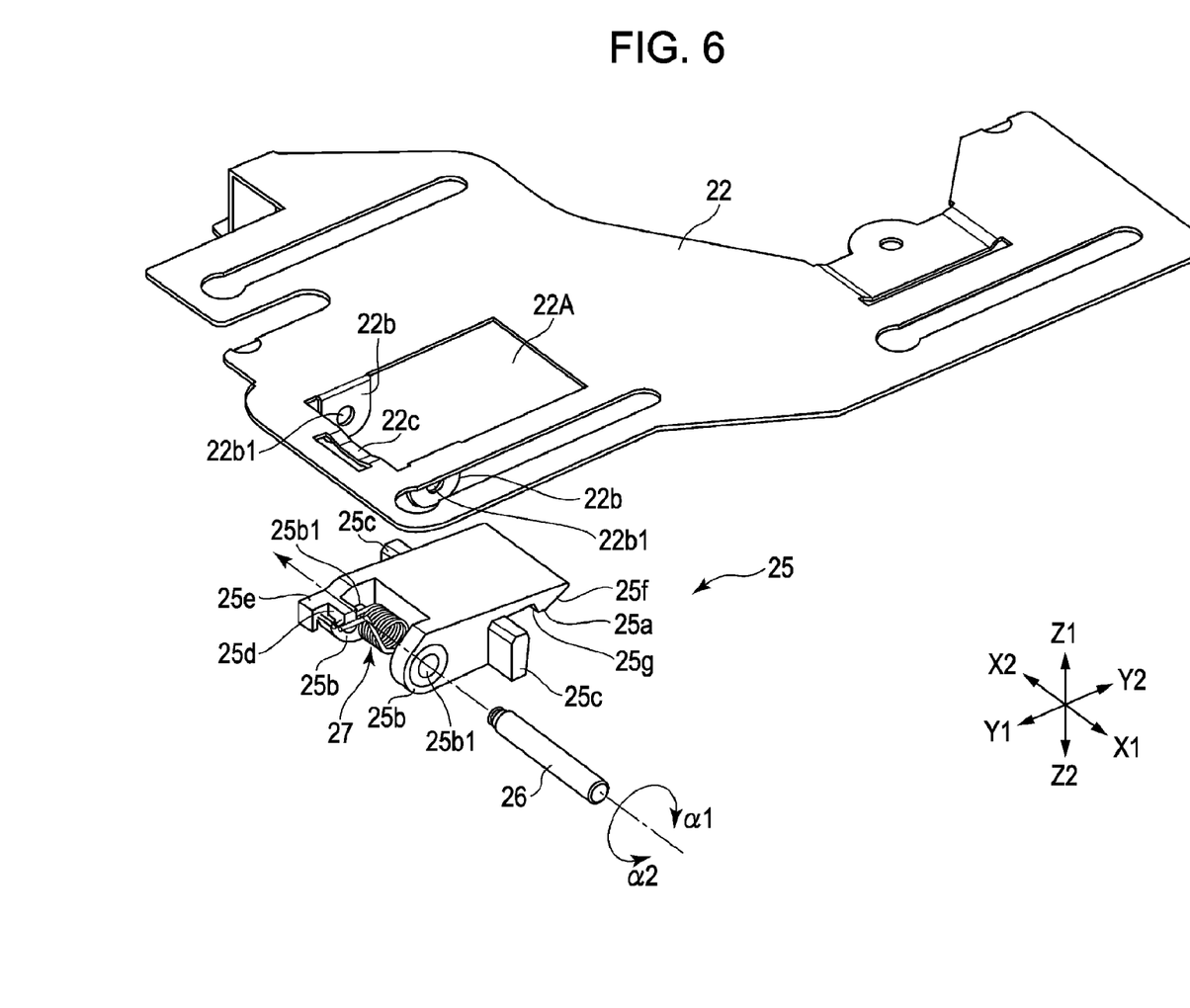
FIG. 6 is a perspective view showing a slider and a conveying member.
Figure 7:
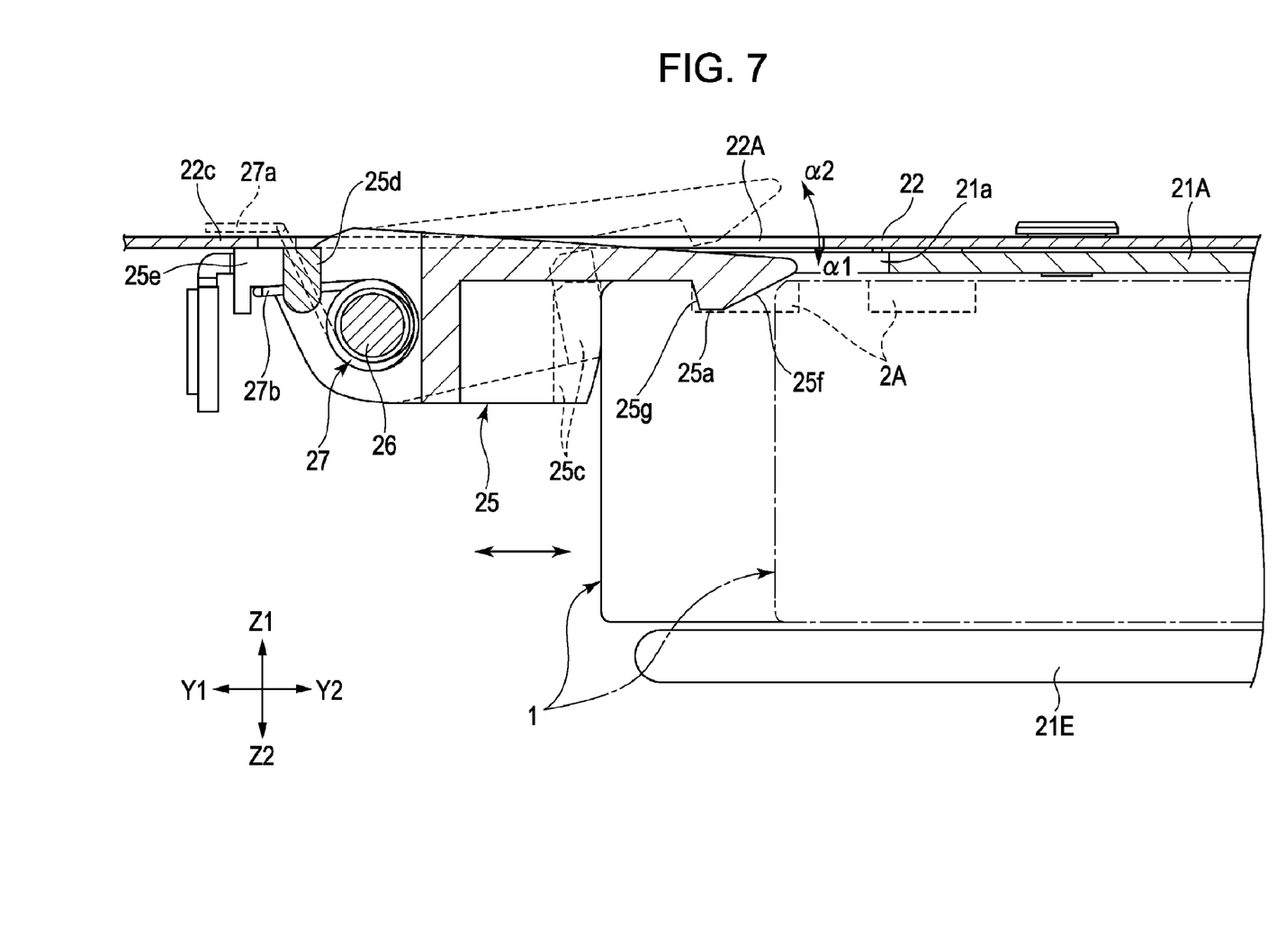
FIG. 7 is a cross-sectional view showing the slider and the conveying member in detail.
Figure 8:
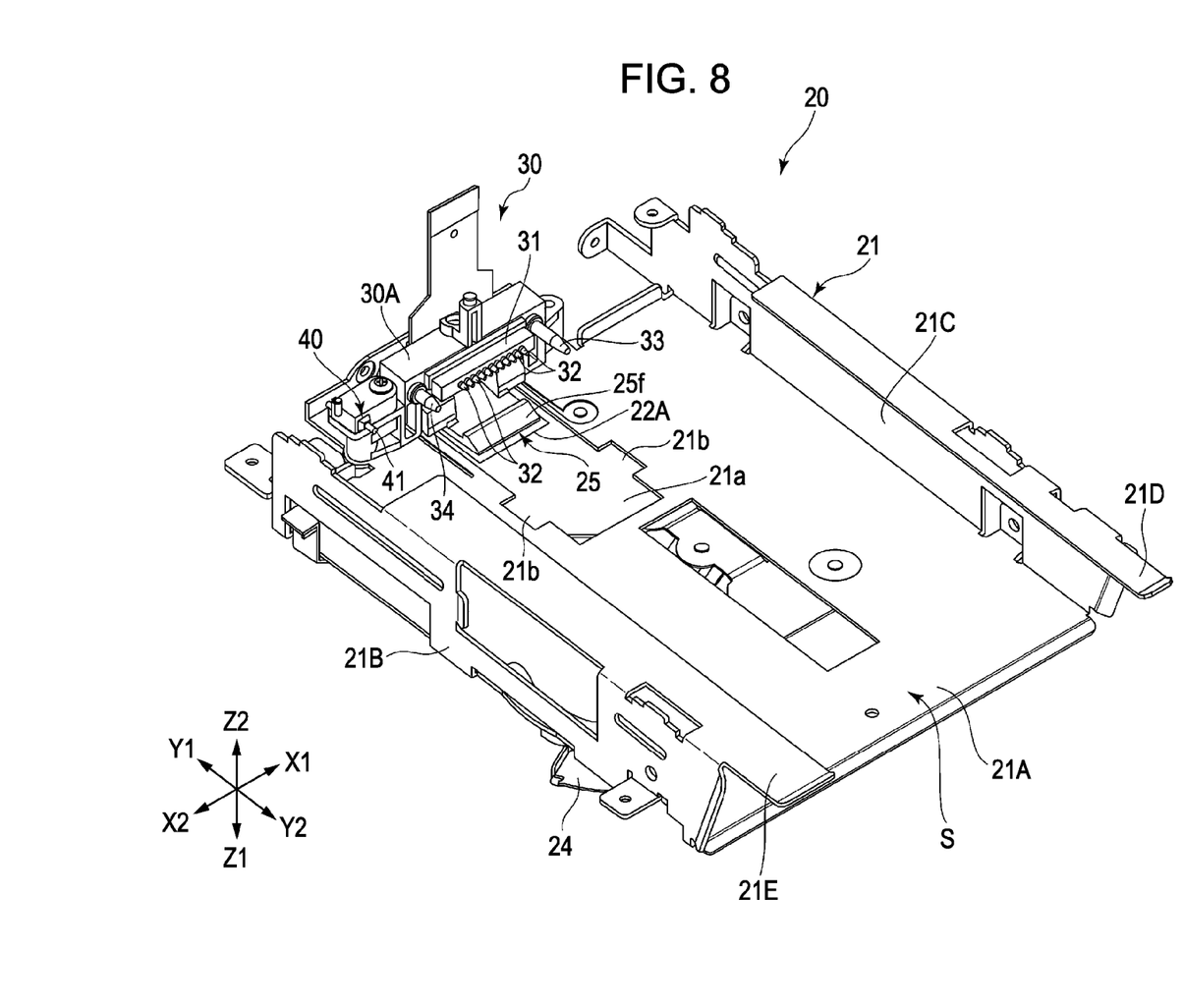
FIG. 8 is a perspective view showing the driving-device body from a direction different from that in FIG. 4.

FIG. 3 is a perspective view showing the appearance of a recording-medium driving device according to the present invention. FIG. 4 is an exploded perspective view of a driving-device body contained in the recording-medium driving device. FIG. 5 is a plan view of the driving-device body. FIG. 6 is a perspective view showing a slider and a conveying member. FIG. 7 is a cross-sectional view showing the slider and the conveying member in detail. FIG. 8 is a perspective view showing the driving-device body from a direction different from that in FIG. 4.

Referring to FIG. 3, a recording-medium driving device 10 is box shaped, and has a decorative panel 11 at a forward position (Y2 side) thereof. The decorative panel 11 has an opening 12 for insertion and ejection of the medium casing 1. The opening 12 has an openable/closable shutter 13 disposed therein. The shutter 13 has an upper edge whose opposite ends in the X direction are pivotably supported by the opposite inner faces of the opening 12, respectively, whereby the shutter 13 is pivotable into the opening 12. When inserted through the opening 12, the medium casing 1 moves toward the interior of the recording-medium driving device 10 while pushing open the shutter 13 inward.

Referring to FIG. 4, the recording-medium driving device 10 contains a driving-device device body 20.

The driving-device body 20 includes a metallic chassis 21. The chassis 21 has a top surface 21A, side surfaces 21B and 21C formed by bending opposite ends of the top surface 21A substantially by an orthogonal angle toward the Z2 direction, and bottom surfaces 21D and 21E formed by bending the ends of the side surfaces 21B and 21C inward substantially by an orthogonal angle. Consequently, as shown in FIG. 4, the front side of the chassis 21 has a substantially rectangular space S surrounded by the top surface 21A, the side surfaces 21B and 21C, and the bottom surfaces 21D and 21E.

If the face-to-face dimension between the top surface 21A and the bottom surfaces 21D and 21E in the height direction is represented as H, then the face-to-face dimension H may be set such that it is greater than or equal to the thickness h of the medium casing 1 but is smaller than the overall thickness h+Δh of the medium casing 1 including the height Δh of the projections 3a, 3b, 3c, and 3d (h≦H<h+Δh). The bottom surface 21E is given a width WE that is greater than the width WD of the bottom surface 21D (WE>WD).

As shown in FIG. 4, the top surface 21A at the Z1 side of the chassis 21 has disposed thereon a slider 22 that is movable in the Y direction corresponding to the direction of insertion and ejection of the medium casing 1, and an arm 24 that is rotatably supported by a rotary shaft 23.

A support pin 22a is provided near a tip end of the slider 22 extending towards the Y2 direction. A U-shaped hole 24a is formed at a tip end of the arm 24, and the support pin 22a is fitted in this U-shaped hole 24a. In other words, the slider 22 and the arm 24 are linked to each other via the support pin 22a. Therefore, when the slider 22 moves in the Y1 direction or the Y2 direction, the support pin 22a presses the U-shaped hole 24a in the Y direction, thus causing the arm 24 to rotate clockwise or counterclockwise depending on the pressing direction. On the other hand, when the arm 24 rotates clockwise or counterclockwise, the slider 22 moves in the Y1 direction or the Y2 direction depending on the rotating direction.

The chassis 21 has a substantially rectangular aperture 21a in an inward section thereof near the Y1 side. The edges of the aperture 21a opposite to each other in the X direction have extension apertures 21b and 21b that partly increase the width of the aperture 21a in the X1 and X2 directions, respectively.

Similarly, the slider 22 has an aperture 22A in an inward section thereof near the Y1 side, the aperture 22A being formed into a substantially rectangular shape so as to correspond to the aperture 21a in the chassis 21.

Referring to FIGS. 4 and 5, the aperture 21a has disposed therein a conveying member 25. Referring to FIG. 6, the conveying member 25 has an engagement projection 25a, a pair of supporting portions 25b and 25b, and a pair of pressing portions 25c and 25c. Specifically, the engagement projection 25a is provided on the undersurface of the conveying member 25 at a position near the tip end thereof extending towards the Y2 side. The supporting portions 25b and 25b are provided at the rear end of the conveying member 25 extending towards the Y1 side. The pressing portions 25c and 25c are disposed between the engagement projection 25a and the pair of supporting portions 25b and 25b and protrudes in the X1 and X2 directions, respectively. As shown in FIGS. 6 and 7, the Y2-side tip end of the engagement projection 25a has a first tapered portion 25f having a gentle slope, whereas the Y1-side end of the engagement projection 25a has a second tapered portion 25g having a steeper slope as compared to the first tapered portion 25f.

The supporting portions 25b and 25b respectively have through holes 25b1 and 25b1 extending in the X direction. Furthermore, one of the supporting portions 25b is integrally provided with a retainer projection 25d and a stopper lug 25e.

The slider 22 has a pair of bent segments 22b and 22b extending from opposite edges of the aperture 22A. These bent segments 22b and 22b are formed by being bent downward (Z2 direction) from the opposite edges of the aperture 22A. The bent segments 22b and 22b respectively have through holes 22b1 and 22b1.

The pair of through holes 25b1 and 25b1 of the conveying member 25 is positioned between the pair of through holes 22b1 and 22b1 of the slider 22, and a support shaft 26 is inserted through these holes. Thus, the conveying member 25 is supported in a rotatable fashion about the support shaft 26 in α1 and α2 directions relative to the slider 22 (see FIG. 6). A torsion coil spring 27 serving as a bias member is disposed around the support shaft 26. As shown in FIG. 7 in an enlarged view, one end 27a of the torsion coil spring 27 is retained by a retainer portion 22c provided on the slider 22, and the other end 27b of the torsion coil spring 27 is retained by the retainer projection 25d formed on one of the supporting portions 25b of the conveying member 25. Therefore, the conveying member 25 constantly receives a bias force in the α1 direction, that is, a force that biases the conveying member 25 away from the slider 22.

However, since the upper surface of the stopper lug 25e of the conveying member 25 abuts on the undersurface of the slider 22 at near the Y1-side edge of the aperture 22A as shown in FIG. 7, the conveying member 25 is maintained in a tilted state in which the engagement projection 25a at the tip end of the conveying member 25 is held in a slightly rotated and tilted position towards the α1 direction. In this state, the pair of pressing portions 25c and 25c is held away from the slider 22. Consequently, as shown with a dotted line in FIG. 7, when the conveying member 25 is pressed in the Z1 direction, the conveying member 25 is capable of being rotated in the α2 direction until the upper surfaces of the pressing portions 25c and 25c come into abutment with the undersurface of the slider 22 near the opposite edges of the aperture 22A.

Referring to FIG. 8, the chassis 21 has a second connector 30 in an inward section thereof near the Y1 side.

The second connector 30 has a base 30A that is fixed to the chassis 21. This base 30A is provided with a projected connector portion 31 that extends longitudinally in the X direction. The connector portion 31 has a plurality of connector pins 32 that are arranged in line at a fixed interval in the X direction. Each connector pin 32 is projectable and retractable in the Y direction and contains a resilient member (not shown). With the bias force of the resilient member, the connector pin 32 is constantly biased and projected in the Y2 direction. Therefore, when the connector pin 32 is pressed in the Y1 direction, the connector pin 32 retracts into the connector portion 31, but when the pressing force is released, the connector pin 32 projects again in the Y2 direction. The medium casing 1 and the driving-device body 20 can be electrically connected to each other by bringing the connector pins 32 into contact with the corresponding external terminals 5a provided in the first connector 5 of the medium casing 1.

As shown in FIG. 8, a reference guide pin (first guide pin) 33 and a subsidiary guide pin (second guide pin) 34, both extending in the Y2 direction, are respectively provided adjacent to opposite ends of the connector portion 31 in the X direction and on the Y2-side surface of the base 30A. The reference guide pin 33 includes a main body section having a fixed diameter φ1 and a tapered section that is tapered toward the tip end thereof. Likewise, the subsidiary guide pin 34 includes a main body section having a fixed diameter φ2 and a tapered section that is tapered toward the tip end thereof.

The diameter φ1 of the main body section of the reference guide pin 33 may be greater than the diameter φ2 of the main body section of the subsidiary guide pin 34 (φ1>φ2). Both of these diameters may be smaller than the inside diameter of the positioning holes 6a and 6b formed in the first connector 5 of the medium casing 1. Furthermore, the overall length of the reference guide pin 33 may be greater than the overall length of the subsidiary guide pin 34.

The driving-device body 20 accommodates a driving mechanism that rotates the arm 24 in clockwise and counterclockwise directions, a driving motor that applies a driving force to the driving mechanism, a control unit that controls the rotation of the driving motor as well as controlling writing and reading of data with respect to a recording medium, and various detection sensors.

The operation of the recording-medium driving device will now be described.

Figure 9:
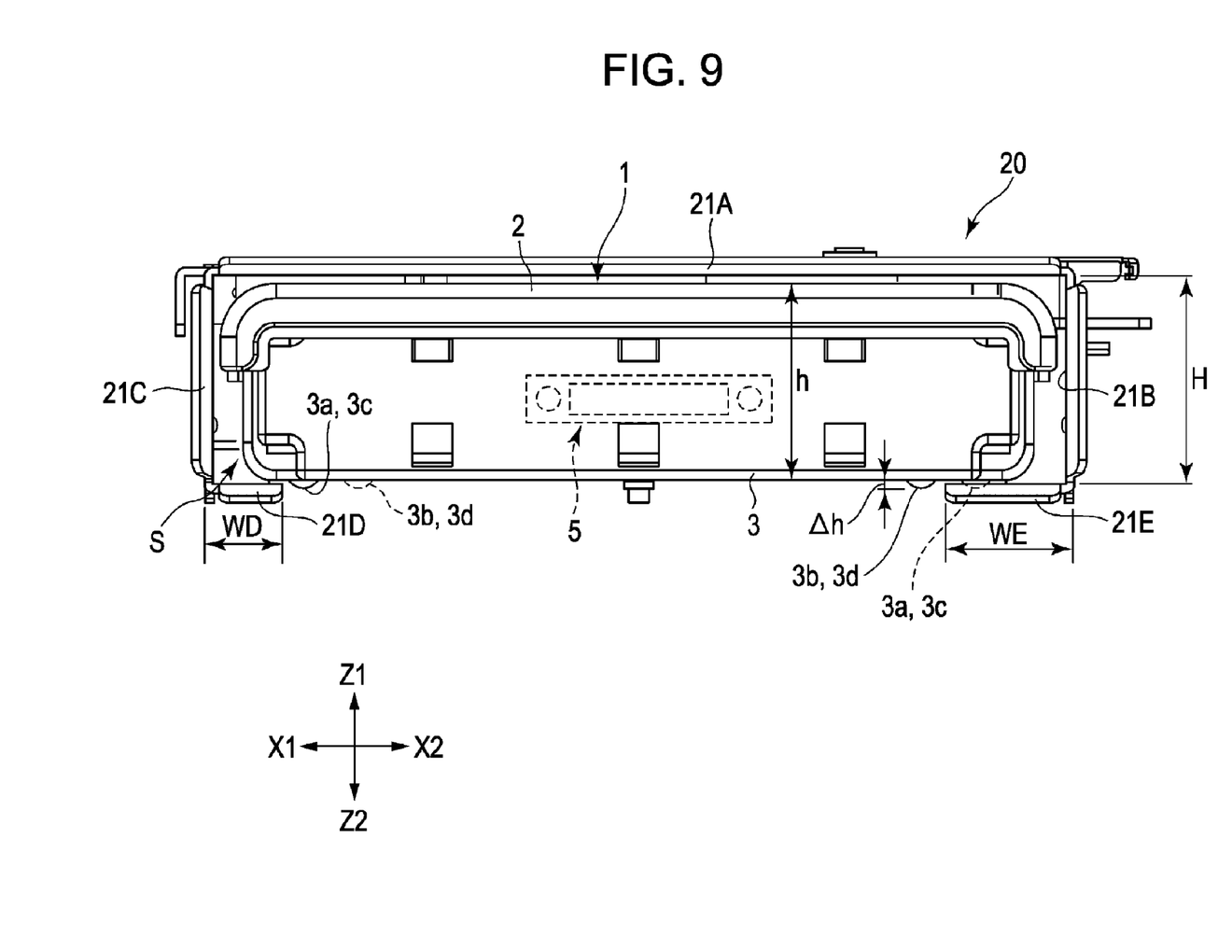
FIG. 9 is a front view of the driving-device body and shows a case where the medium casing is inserted properly in its front-rear direction (solid line) and also shows a case where the medium casing is inserted improperly from its wrong end (dotted line)
Figure 10:
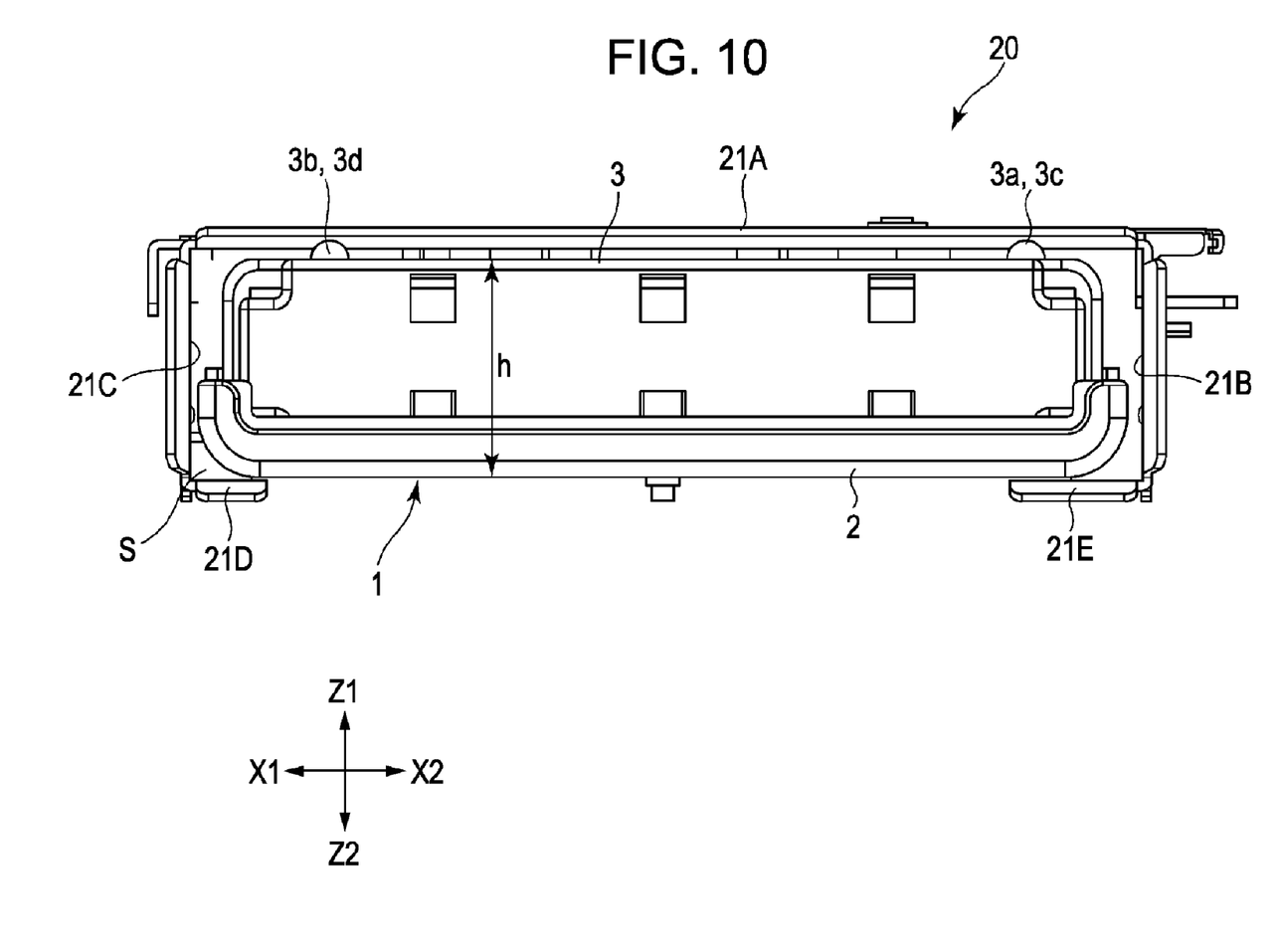
FIG. 10 is a front view of the driving-device body and shows a state where the medium casing is inserted upside down.

FIG. 9 is a front view of the driving-device body and shows a case where the medium casing is inserted properly in its front-rear direction (solid line) and also shows a case where the medium casing is inserted improperly from its wrong end (dotted line). FIG. 10 is a front view of the driving-device body and shows a state where the medium casing is inserted upside down.

In the initial state where the medium casing 1 is not yet inserted, the slider 22 is shifted to a position most proximate to the opening 12 (Y2 direction) and the arm 24 is rotated in the counterclockwise direction. In this state, the conveying member 25 attached to the slider 22 is set such that the pressing portions 25c and 25c are respectively positioned within the extension apertures 21b and 21b formed in the slider 22. Moreover, the conveying member 25 is rotated in the α1 direction (see FIG. 7) such that the engagement projection 25a projects into the interior of the chassis 21 through the aperture 22A in the slider 22 and the aperture 21a in the chassis 21.

The medium casing 1 is inserted through the opening 12 by pushing open the shutter 13. Then, the medium casing 1 is inserted into the space S from the front side of the chassis 21.

When the medium casing 1 is inserted properly into the space S from the front side of the chassis 21 as shown with the solid line in FIG. 9, the projections 3b and 3d at the X2 side of the lower casing component 3 are positioned closer to the center in the width direction relative to the inner edge of the bottom surface 21E. Likewise, the projections 3a and 3c at the X1 side of the lower casing component 3 are positioned closer to the center in the width direction relative to the inner edge of the bottom surface 21D. Consequently, in the properly inserted state, the projections 3a and 3c and the projections 3b and 3d are prevented from coming into contact with the bottom surface 21D and the bottom surface 21E, respectively, so that the left and right edges of the lower casing component 3 in the X direction can be slid inward smoothly on the bottom surfaces 21D and 21E of the chassis 21 while being supported by these bottom surfaces 21D and 21E. In other words, when the medium casing 1 is properly inserted, the projections 3a and 3c and the projections 3b and 3d are passed through between the bottom surface 21D and the bottom surface 21E of the chassis 21 in the moving direction and are thus prevented from coming into contact with the bottom surface 21D and the bottom surface 21E, thereby allowing for smooth insertion of the medium casing 1.

On the other hand, the following describes a case where the medium casing 1 is inserted improperly from its wrong end into the space S from the front side of the chassis 21.

Specifically, as shown with the dotted line in FIG. 9, if the medium casing 1 is to be inserted improperly from its wrong end in the front-rear direction, the projection 3c near the leading end of the medium casing 1 in the insertion direction would be positioned within the range of width WE of the bottom surface 21E. In this state, the overall thickness h+Δh of the medium casing 1 at the side thereof with the projection 3c exceeds the face-to-face dimension H between the top surface 21A and the bottom surface 21E. For this reason, the medium casing 1 cannot be inserted any further inward since the leading end of the medium casing 1 becomes held between the top surface 21A and the bottom surface 21E near the entrance of the chassis 21. This allows the user to acknowledge that the medium casing 1 has been inserted improperly at an early stage of the insertion process.

Referring to FIG. 10, when the medium casing 1 is inserted in an upside-down position into the chassis 21, the upper casing component 2 of the medium casing 1 becomes supported by the bottom surfaces 21D and 21E of the chassis 21. If the medium casing 1 in this state is to be further inserted into the chassis 21, the projections 3a and 3b near the insertion end of the lower casing component 3 would abut on the top surface 21A of the chassis 21. Therefore, the medium casing 1 in the upside-down position can be prevented from being inserted any further. This allows the user to acknowledge that the medium casing 1 has been inserted improperly at an early stage of the insertion process.

In the case where the medium casing 1 is inserted improperly from its wrong end as well as in an upside-down position, such improper insertion of the medium casing 1 can be prevented at an early stage of the insertion process in the similar manner.

Accordingly, in the present invention, the medium casing 1 is allowed to be inserted into the device only when the medium casing 1 to be inserted is properly oriented, and the insertion of the medium casing 1 can be prevented at an early stage of the insertion process if the medium casing 1 to be inserted is improperly oriented.

Referring to FIG. 7, as the properly oriented medium casing 1 is inserted deep into the chassis 21, the leading end of the medium casing 1, namely, the insertion end of the upper casing component 2, comes into abutment with the first tapered portion 25f of the conveying member 25 that protrudes into the chassis 21. As the medium casing 1 is inserted further, the leading end of the medium casing 1 pushes the first tapered portion 25f of the conveying member 25 upward in the α2 direction.

As the medium casing 1 is inserted deeper into the chassis 21, the engagement projection 25a following the first tapered portion 25f moves up onto the upper surface of the upper casing component 2 and subsequently fits into the engagement recess 2A, whereby the engagement projection 25a becomes engaged with the engagement recess 2A by the bias force of the torsion coil spring 27. In this state, the insertion end of the upper casing component 2 is in abutment with the front surfaces (Y2-side surfaces) of the pressing portions 25c and 25c of the conveying member 25.

As the medium casing 1 is inserted even deeper into the chassis 21, the medium casing 1 applies pressure to the front surfaces of the pressing portions 25c and 25c in the insertion direction. This causes the conveying member 25 and the slider 22 supporting the conveying member 25 to become shifted inward together with the medium casing 1.

When the medium casing 1 has been inserted into the chassis 21 by a certain amount or more, a detection sensor (not shown) disposed within the driving-device body 20 detects the state of insertion and sends the detection signal to the control unit (not shown). The control unit then actuates the driving motor so as to rotate the arm 24 clockwise in FIG. 5. This causes the slider 22 to be shifted deeper into the device, whereby the medium casing 1 engaged with the engagement projection 25a of the conveying member 25 becomes loaded deep into the device.

At the same time, the pressing portions 25c and 25c respectively move out of the extension apertures 21b and 21b formed in the top surface 21A so as to hide below the underside of the top surface 21A. Accordingly, the pressing portions 25c and 25c of the conveying member 25 in the course of movement normally face the underside of the top surface 21A without coming into contact therewith. On the other hand, if the conveying member 25 in the course of movement receives any kind of force in the α2 direction, the pressing portions 25c and 25c come into contact with the underside of the top surface 21A so as to restrict the rotation of the conveying member 25 in the α2 direction. This ensures that the medium casing 1 can be pulled inward properly without the engagement projection 25a of the conveying member 25 becoming disengaged from the engagement recess 2A of the medium casing 1.

As the loaded medium casing 1 is moved deep into the device, the first connector 5 of the medium casing 1 becomes connected to the second connector 30 of the driving-device body 20.

To describe this connection process in detail, the reference guide pin 33 and the subsidiary guide pin 34 are first inserted respectively through the positioning holes 6a and 6b located adjacent to the opposite ends of the first connector 5 of the medium casing 1. In this case, the reference guide pin 33 with the greater length is first inserted through the positioning hole 6a of the medium casing 1, and then the subsidiary guide pin 34 is inserted through the positioning hole 6b. Therefore, the medium casing 1 is guided deep into the device (in the Y1 direction) on the basis of the reference guide pin 33.

A gap formed between the surface of the reference guide pin 33 and the inner surface of the positioning hole 6a is narrower than a gap formed between the surface of the subsidiary guide pin 34 and the inner surface of the positioning hole 6b. Therefore, even when the medium casing 1 is inserted in a displaced state in a direction orthogonal to the insertion direction, such displacement can be compensated for gradually with the movement of the medium casing 1. By the time the reference guide pin 33 and the subsidiary guide pin 34 are respectively fitted in the positioning hole 6a and the positioning hole 6b, the medium casing 1 can be set to a proper position without displacement. Accordingly, the projected connector portion 31 of the second connector 30 in the driving-device body 20 can be properly joined (or engaged) to the recessed connector portion 5A of the first connector 5 in the medium casing 1. As a result, the plurality of external terminals 5a in the medium casing 1 become respectively connected to the plurality of connector pins 32 in the driving-device body 20.

Referring to FIG. 8, the front surface (Y2-side surface) of the base 30A is provided with a pressure sensor 40. When the front panel 4 of the medium casing 1 moved deep into the device presses an actuator portion 41 of the pressure sensor 40, the switch mode changes. When this information about the changing of the switch mode is sent to the control unit (not shown), the control unit stops the driving motor. The control unit accesses the recording medium in the medium casing 1 via the connector portion 31 and the connector portion 5A as necessary, so as to write data into the recording medium or to read out written data from the recording medium.

Accordingly, in the present invention, the medium casing 1 is guided deep into the driving-device body 20 on the basis of the reference guide pin 33 having the greater diameter. Therefore, even when the medium casing 1 is inserted in a displaced state in the width direction, such displacement can be compensated for, thereby allowing for satisfactory electrical connection between the connector terminals.

Referring to FIG. 3, the front surface of the decorative panel 11 is provided with an eject switch 14. When the user presses this eject switch 14, the control unit drives the driving motor in a direction opposite to that for the insertion process. This causes the arm 24 to rotate counterclockwise in FIG. 5, thereby forcing the slider 22 to move in the ejection direction (Y2 direction). Thus, the front surfaces of the pressing portions 25c and 25c formed on the conveying member 25 that moves together with the slider 22 come into abutment with the front surface of the medium casing 1 facing towards the insertion direction, so as to press the front surface of the medium casing 1 in the ejection direction. This ensures proper movement of the medium casing 1 in the ejection direction.

As the medium casing 1 is moved in the ejection direction together with the slider 22, the pressing portions 25c and 25c of the conveying member 25 are shifted from their positions facing the underside of the top surface 21A to positions corresponding to the extension apertures 21b and 21b, respectively. As a result, the conveying member 25 becomes rotatable in the α2 direction (see FIG. 7). Moreover, when the medium casing 1 is moved in the ejection direction, the rear end (Y2-side end) of the medium casing 1 becomes projected outward from the decorative panel 11 through the opening 12.

As the user holds and pulls out the medium casing 1, the second tapered portion 25g at the Y1 side of the engagement projection 25a of the conveying member 25 slides onto the upper edge of the engagement recess 2A in the medium casing 1. In this case, a lifting force acts on the second tapered portion 25g in the Z1 direction, thus causing the conveying member 25 to rotate in the α2 direction against the bias force of the torsion coil spring 27. As a result, the engagement projection 25a of the conveying member 25 becomes disengaged from the engagement recess 2A, whereby the locked state by the engagement recess 2A becomes released. Consequently, the medium casing 1 can be taken out of the recording-medium driving device 10.

As described above, according to the present invention, the engagement of the engagement projection 25a formed on the conveying member 25 to the engagement recess 2A of the medium casing 1 can ensure that the medium casing 1 can be pulled inward properly into the device at the time of the insertion process. In addition, the pressing portions 25c and 25c of the conveying member 25 configured to press the medium casing 1 in the ejection direction at the time of the ejection process can allow for proper ejection of the medium casing 1.

What is claimed is:

1. A recording-medium driving device comprising:
   an opening through which a casing containing at least a recording medium is insertable and ejectable;

a chassis that supports the casing inserted into the opening and that has a connector portion electrically connectable to the recording medium; and a conveying mechanism that conveys the casing in a moving direction between the opening and an inward section of the device, wherein one of surfaces of the casing has four corners provided with left and right projections, the left and right projections being positioned bilaterally asymmetrical with respect to a center line passing through a center of the recording medium and extending parallel to the moving direction, and wherein the chassis has a top surface facing an upper surface of the casing and a pair of left and right bottom surfaces extending in the moving direction and respectively supporting opposite edges of a lower surface of the casing, one of the bottom surfaces having a width smaller than that of the other bottom surface.

2. The recording-medium driving device according to claim 1, wherein a distance between the one of the bottom surfaces and the other bottom surface of the chassis is greater than a distance between the left and right projections of the casing, wherein when the casing inserted into the opening is properly oriented, the left and right projections are located between the one of the bottom surfaces and the other bottom surface disposed opposite to each other in a width direction of the chassis, and wherein when the casing inserted into the opening is oriented improperly in a front-rear direction thereof, at least one of the projections is located on the other bottom surface having the greater width.

3. The recording-medium driving device according to claim 1, wherein the following condition is satisfied:

$$h \leq H < h + \Delta h$$

where H denotes a height between the top surface and the bottom surfaces of the chassis, h denotes a thickness of the casing, and $\Delta h$ denotes a height of each of the projections.

* * * * *